US009026640B2

(12) United States Patent
Loboz et al.

(10) Patent No.: US 9,026,640 B2
(45) Date of Patent: May 5, 2015

(54) DETERMINING SERVER UTILIZATION

(75) Inventors: Charles Z. Loboz, Redmond, WA (US);
Steve Lee, Belleveue, WA (US);
Thomas R. Harpel, Kirkland, WA (US)

(73) Assignee: Microsoft Technology Licensing, LLC,
Redmond, WA (US)

( * ) Notice: Subject to any disclaimer, the term of this patent is extended or adjusted under 35 U.S.C. 154(b) by 1232 days.

(21) Appl. No.: 12/477,221

(22) Filed: Jun. 3, 2009

(65) Prior Publication Data
US 2010/0312873 A1    Dec. 9, 2010

(51) Int. Cl.
*G06F 15/173* (2006.01)
*G06Q 30/04* (2012.01)
*G06Q 10/06* (2012.01)

(52) U.S. Cl.
CPC .......... *G06Q 30/04* (2013.01); *G06Q 10/06393* (2013.01)

(58) Field of Classification Search
CPC ........................ G06Q 10/06393; G06Q 30/04
See application file for complete search history.

(56) References Cited

U.S. PATENT DOCUMENTS

| | | | |
|---|---|---|---|
| 6,795,928 B2 * | 9/2004 | Bradley et al. ............... | 709/226 |
| 6,978,257 B1 | 12/2005 | Halbout | |
| 7,461,274 B2 | 12/2008 | Merkin | |
| 2002/0156884 A1 | 10/2002 | Bertram et al. | |
| 2004/0103189 A1 | 5/2004 | Cherkasova et al. | |
| 2006/0092851 A1 | 5/2006 | Edlund | |
| 2006/0168278 A1 * | 7/2006 | Lazen et al. ................. | 709/230 |
| 2007/0124730 A1 * | 5/2007 | Pytel ............................. | 718/100 |
| 2007/0283360 A1 | 12/2007 | Koretz et al. | |
| 2008/0154837 A1 | 6/2008 | Morimura et al. | |
| 2009/0235265 A1 * | 9/2009 | Dawson et al. ............... | 718/104 |
| 2009/0292654 A1 * | 11/2009 | Katiyar et al. ................ | 705/412 |
| 2010/0121788 A1 * | 5/2010 | Vaidyanathan et al. ...... | 705/412 |

OTHER PUBLICATIONS

HP Capacity Advisor Version 4.0 User's Guide; Copyright 2006-2008 Hewlett-Packard Development Company, L.P., Published May 2008; http://www.docs.hp.com/en/T8670-90001/78670-9001.pdf; 167 pages.
John Dilley, Rich Friedrich, Tai Jin and Jerome Rolia; Measurement Tools and Modeling Techniques for Evaluating Web Server Performance; http://www.hpl.hp.com/techreports/96/HPL-96-161.pdf; 12 pages.
John Pflueger and Sharon Hanson; Feb. 2007; Data Center Efficiency in the Scalable Enterprise; http://www.dell.com/downloads/global/power/ps1q07-20070210-CoverStory.pdf; pp. 8 to 14.

(Continued)

*Primary Examiner* — Thu Nguyen
*Assistant Examiner* — Nam Tran
(74) *Attorney, Agent, or Firm* — Ben Tabor; David Andrews; Micky Minhas

(57) ABSTRACT

Ways are disclosed for determining a utilization of a server or group of servers. In one embodiment, a method includes determining a disk utilization factor (DUF) that indicates a utilization of one or more mass-storage disks of some server; determining a processor utilization factor (PUF) that indicates a utilization of one or more processors running on the first server; and based on the DUF and PUF deriving a server-utilization factor (SUF) that indicates a level of utilization of the first server, which includes incorporating one or more of (1) power-usage data or (2) financial-cost data that are associated with each of the disks and processors.

19 Claims, 4 Drawing Sheets

(56) References Cited

OTHER PUBLICATIONS

Data Center Efficiency Measurements; Apr. 8, 2009; http://www.google.cz/corporate/datacenters/measuring.html; 5 pages.

Lauren Nowenstein; Data Center Performance Measurement to mitigate Challenges; Apr. 8, 2009; http:/www.streetdirectory.com/travel_guide/116479/technology/data_center_performance_measurement_to_mitigate_challenges.html; 2 pages.

Greg Schulz; ByteandSwitch, The Storage Networking Site; Data Center Measurement, Metrics & Capacity Planning; Apr. 1, 2009; http://www.byteanswitch.com/document.asp?doc_id=174585, 2 pages.

International Search Report; PCT Application No. PCT/US2010/037003 filed Jun. 2, 2010; Date of mailing: Dec. 22, 2010, 8 pages.

"Supplementary Search Report Received for European Patent Application No. 10783976.3", Mailed Date: Jul. 31, 2014, 7 Pages.

"First Office Action and Search Report Received for China Patent Application No. 201080025832.9", Mailed Date: Nov. 25, 2013, 14 Pages.

"Office Action Received for China Patent Application No. 201080025832.9", Mailed Date: Aug. 6, 2014, 9 Pages.

"Office Action Received for Japanese Patent Application No. 2012-514063", Mailed Date: Feb. 25, 2014, 6 Pages.

* cited by examiner

DETERMINING SERVER UTILIZATION

SUMMARY

Embodiments of the invention are defined by the claims below, not this summary. A high-level overview of various aspects of the invention is provided here, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways to derive a server utilization factor that indicates a utilization of a given server and to derive a server-group utilization factor that indicates an overall utilization of a set of servers. Our technology contemplates deriving factors based on work and work capacity of components of a server (such as disks, processors, and networking cards) and then weighting those factors by either, for example, dollar costs or power usages of each of the components.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
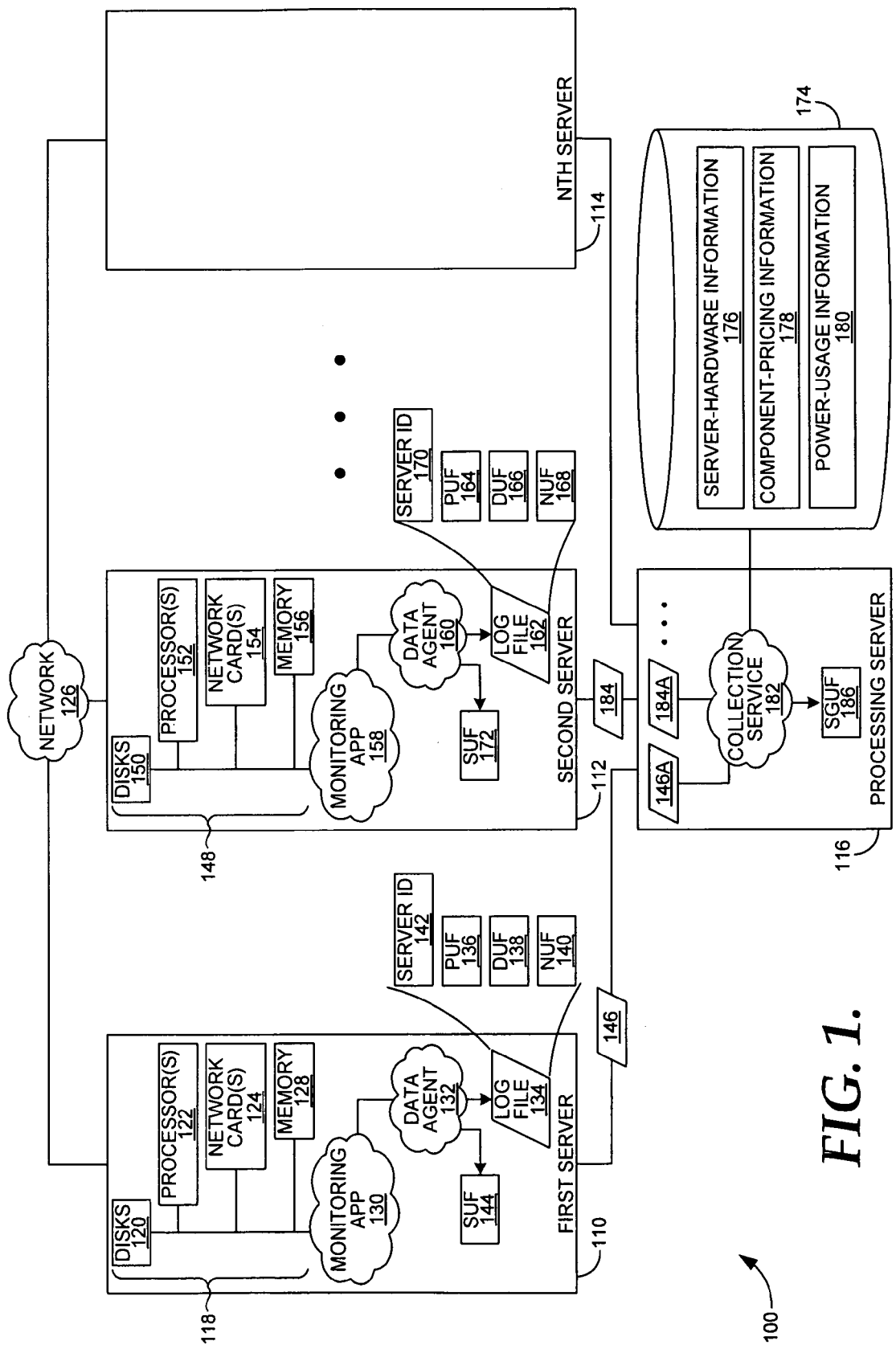
FIG. 1 depicts an illustrative operating environment suitable for practicing an embodiment of the present invention.

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the present invention may be embodied as, among other things: a method, system, or set of instructions embodied on computer-readable media. Computer-readable media include both volatile and nonvolatile media, removable and nonremovable media, and contemplate media readable by a database, a node (computing device), and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Several acronyms/definitions will be referred to throughout this disclosure. For ease of reference, they are consolidated in the table below:

TABLE I

| Acronyms/Definitions | |
| --- | --- |
| CUF | Capacity Utilization Factor |
| Disk Capacity | Data amount maximally transferable during a given time period (as used herein, this is not to be confused with merely the size of the disk) |
| DUF | Disk Utlization Factor - a measure of a disk's capacity utilization |
| NIC Capacity | Networking Component Capacity = maximum number of bytes transferrable via a given networking component of a server during a given period of time |
| NIC Work | Networking Component Work = actual bytes transferred via a given networking component of a server |
| NUF | Networking-component Utilization Factor - a measure of a capacity utilization of a networking component that forms part of a server |
| Processor Capacity | Maximum number of instructions that a processor was capable of executing during a given time period |
| Processor Utilization | An average percentage of full capacity that a processor operated at during a given period of time. |
| PUF | Processor Utilization Factor - a measure of a processor's capacity utilization |
| RPI | Relative Performance Index - an index that relates speed of one processor to another (a processor of RPI "2" operates at twice the performance of a processor with RPI of "1." |
| SGUF | Server-Group Utilization Factor - a measure of a capacity utilization of a group of servers |
| SUF | Server Utilization Factor - a measure of a server's capacity utilization |

Several equations will be referred to throughout this disclosure. For ease of reference, they are consolidated in the table below:

TABLE 2

| | Equations |
| --- | --- |
| (1) | Processor Work = (Processor Utilization) * (# of processors) * (Relative Performance Index) * (measure of time period) |
| (2) | Processor Capacity = 100% * (# of processors) * (Relative Performance Index) * (measure of time period) |
| (3) | PUF = (processor work)/(processor capacity) |
| (4) | Disk Work = (percent busy during a given time period) * (disk size as proxy for volume transfer rate) * (measure of time period) |
| (5) | Disk Work Capacity = 100% * (disk size as proxy for volume transfer rate) * (measure of time period) |
| (6) | DUF = (disk work)/(disk capacity) |
| (7) | Total Disks CUF = (total disk work)/(total of disks' capacities) |
| (8) | Networking Work = actual bytes transferred during a certain period of time |
| (9) | Networking Capacity = Maximum number of bytes transferable during the same certain period of time |
| (10) | NUF = Networking Work/Network Capacity |
| (11) | SUF1 = (PUF * processor cost benchmark) + (DUF * disk cost benchmark) [in some embodiments + (NUF + NIC cost benchmark) |

TABLE 2-continued

| | Equations |
|---|---|
| (12) | SUF2 = (PUF * processor power benchmark) + (DUF * disk power benchmark) [in some embodiments + (NUF + NIC power benchmark) |
| (13) | SGUF1 = (utilized dollar value of all desirably considered components in servers)/(total dollar value of all desirably considered components in servers) |
| (14) | SGUF2 = (power usage of all desirably considered components in servers)/(total power consumable by all desirably considered components in servers) |

As briefly mentioned, one way that our technology helps determining (measuring) server or server-group utilization is to base the determination on something other than usage per se, but on other information such as dollar costs or power-usage characteristics.

Turning now to FIG. 1, an illustrative operating environment suitable for practicing an embodiment of the present invention is provided generally and is referenced by the numeral 100. Operating environment 100 can include a variety of servers. We illustratively show a first server 110, a second server 112, and an NTH server 114, which indicates that many more servers possibility even hundreds or thousands of servers might make up operating environment 100. For the sake of simplicity, the following description might concentrate on first server 110 and second server 112, or even just first server 110 in as much as concepts applicable to first server 110 are generally applicable to those of any other server. In one embodiment, first server 110 and second server 112 are coupled either directly or indirectly to a processing server 116.

First server 110 includes a variety of components 118, aspects or examples of which were briefly mentioned above. By way of example, first server 110 includes one or more hard drives 120, which are variously referred to herein as "disks," as they are in the art. Disks 120 facilitate mass storage of data, normally in a nonvolatile manner.

One or more processors 122 facilitate the interworking and communication of data across the various components 118 and more. Processors 122 can be made by various manufacturers and can have a wide array of attributes. A server might have one processor, two processors, or even tens or possibility hundreds of processors.

A networking card 124 communicates data outside of first server 110 and likewise receives data from, for example a network 126, which might be a local area network, wide area network, the internet, or some other network that couples first server 110 to an external network-communication device (such as a switch, router, modem, etc.).

Memory 128 is commonly referred to as random access memory, which can take on several variations. Normally, the data stored in memory 128 is volatile.

A monitoring application 130 monitors attributes associated with one or all of components 118. For example, monitoring application 130 might monitor an amount of data transferred between disk 120 and memory 128. Similarly, monitoring application 130 might monitor an amount of traffic communicated by way of network card 124. Monitoring application 130 might monitor an amount of usage that processor 122 has utilized for a given period of time. Monitoring application 130 can retrieve or observe a myriad of metrics associated with components 118, which are too numerous to list here.

In one embodiment, a data agent 132 receives data from monitoring application 130 and facilitates storage of certain metrics in a log file 134. Storing data in log file 134 should not be construed as a limitation of the invention; rather as an explanation of one embodiment of a way to carry out the technology we are about to describe in greater detail. Instead of storing data in log file 134 the data could be used in real time in some embodiments, or stored in some other way besides a log file 134. In one embodiment, calculations consistent with those below would be performed in order to store in log 134 a processor utilization factor 136, a disk utilization factor 138, and a applicable networking utilization factor 140. This will all be described in greater detail below. Log file 134 also stores a server ID 142, which is operable to uniquely identify first server 110. In some embodiments, data agent 132 derives a server utilization factor 144 consistent with the below. In other embodiments, processing server 116 can receive PUF 136, DUF 138, and NUF 140 and thereby determine server utilization factor 144.

That is, multiple ways of deriving server utilization factor 144 can be employed. In one embodiment, data 146 outputted from data agent 132 (or monitoring application 130) is retrieved by or communicated to processing server 116. This data is represented by reference numeral 146A in processing server 116, not because it is different from data 146, but because providing a separate referencing numeral will make explaining an embodiment of the present invention easier.

Second server 112 also includes a set of components 148, which might include disks 150, processors 152, networking cards 154, and memory components 156. We do not mean to imply numerical numbers by our use of the singular and plural throughout this description. Generally, whenever we refer to a disk, we contemplate that multiple disks might be contemplated. For wording, sometimes using the singular helps with readability, but we do not mean to imply singularity. The component 148 of second server 112 can be similar to components 118 of first server 110 but also have different attributes. For example, processors 152 might be manufactured by a different vendor then processors 122. Another example might be that processors 152 have a different architecture than processors 122. Disks 150 might be different sizes among themselves or might be different sizes of disks 120. Networking card 154 and second server 112 might have a difference through output capacity then networking cards 124 and first server 110. An aspect of our invention contemplates the differences; embraces them, and addresses them in ultimately determining either a server utilization factor or a server-group utilization factor, which will be described in greater detail below.

Second server 112 also includes a monitoring application 158, which interacts with a data agent 160 to populate, in one example, a log file 162, which stores a processor utilization factor 164, a disk utilization factor 166, and a networking utilization factor 168. In one embodiment, log file 162 also stores a server ID 170, which uniquely identifies second server 112. In some embodiments, data agent 160 can calculate its server utilization factor 172 if it has access to the type of data stored in a database 174.

Database 174 can store various types of information including, for example, server-hardware information 176, component-pricing information 178, and component power-usage information 180. Server-hardware information 176 can take a form of a hardware profile of a server. For example, server hardware information 176 might include detailed information about components 118 and first server 110 or components 148 and second server 112. Thus, by way of first server 110, ID 142, or server ID 170, information associated with the different sets of components 118 or 148 can be gathered and provided to a collection service 182 associated with processing server 116.

Component-pricing information 178 includes pricing information associated with various components. The component-pricing information 178 can be based on current replacement costs or past actual costs. Still further, the pricing information might be represented as a portion of the overall server costs. In one embodiment, component-pricing information 178 includes dollar costs that are mapped to components that make up a certain server. For example, disk 120 might have cost $400 when it was purchased. Processor server 122 might have cost $250 when purchased. This data might form a part of component-pricing information 178. Perhaps disk 150 might cost $5,000 if it had to be replaced. Maybe processor 152 would cost $1,100 to replace. This information could also make up component-pricing information 178. In one embodiment, actual pricing information is stored in database 174. In other embodiments this data is sought out in real time by way of the Internet, for example. That is, it might be the case that pricing information is retrieved from one or more external sources in real time. In other embodiments, component-pricing information 178 is logged and stored in database 174. Multiple-component-pricing information can also be used for different purposes (having more than one SUF1); for example CUF on component prices and/or CUF on component price and maintenance costs (disks need to be replaced from time to time) etc.

Power-usage information 180 indicates an amount of power that various components of a server consumes. In some embodiments, this takes the form of specification-type information in which a devices rated power is used. For example, processors are known to consume x number of watts of power, then that data is stored as part of power-usage information 180. In other embodiments actual power measurement can be taken and used to make up power-usage information 180. For example, a person might actually determine the amount of power that disks 120 are consuming in operation. This data can then be used to populate power-usage information 180. Thus, power-usage information 180 might be actual or estimated.

Collection server 182 collects the various data in database 174 and uses this information in connection with data 146A and 184A, which is the same or similar as data 184, which is similar to data 146 (both being utilization factors of certain components or usage information data gathered from monitoring applications). Collection service 182 receives data 146A, 184A, and other data if applicable to derive either individual server utilization factors for the respect of servers, or a server-group utilization factor 186 that indicates an overall utilization indicator of the capacity of all servers that are desired to be considered.

We will now describe ways of calculating the various utilization factors that we have previously mentioned. Generally, again, we will do so by referring to the components of an arbitrary server such as first server 110 to keep the explanation more simple. We will begin with an introduction of the concept of computer work, and then explain calculating the various utilization factors according to the technology we have developed.

Following is a preliminary discussion about computer work, work capacity, and comments on some practical applications of these notions in the context of server hardware (or any computing device functioning as a server). The notion of computer work that we speak of is somewhat based on the idea of software work that was proposed by Kenneth Kolence in Introduction to Software Physics, McGraw-Hill, 1985. We have expanded on this notion, mapping concepts to computer work instead of software work, which, for example, include introducing a component's work capacity and relating that to the computer work as well as practically applying these notions to hardware.

One aspect of our invention includes managing work and capacity elements across multiple severs of various types, even where each of the servers are made up of multiple components of various types. Managing includes combining the computer work, component-work capacity, and other elements to derive utilization metrics (and even a single indicator) as to multiple servers.

The computer work is a generally invariant measure of work performed on a computer component of given type. We describe computer work and work capacity for various types of components, such as processors, disks, network components (such as network cards or motherboard built-in components).

For processors, a relatively simple solution would be to define work as the number of processor instructions executed. But this is not always practical because (a) different processors (e.g., 122, 152) may have different instruction sets (so performing the same high-level software function/transaction could result in a different number of instructions on different processors) and (b) monitoring equipment often does not measure the number of instructions executed by the processor; rather the amount of time the processor has been active and at what activity level.

Two usable measures of processor work include the number of processor cycles executed and the relative processor power measure. The number of processor cycles executed for a 2 GHz processor with utilization coefficient 50% in the last second can be inferred to be 1 gigacycles; a 3 Gz processor under the same conditions would have executed 1.5 gigacycles. This approach is relatively simple, especially when servers in a datacenter include processors that are the same or similar architecture, differing mostly in clock speed. It is, however, less accurate when comparing systems with widely different architectures or made by different manufacturers.

The relative processor power measure, which can take advantage of a standard benchmark, like SPEC-INT, in one embodiment contemplates leveraging the fraction of the processor utilization multiplied by the processor speed as measured by the standard benchmark. The use of the benchmark is useable to convert the processor time used to a normalized value (e.g., instructions), therefore allowing more accurate comparison of work done on processors of different architecture or performance levels. This approach is slightly more complicated but more accurate when different processor architectures or types are involved.

The work capacity for processors is defined as the maximum amount of work the processor is capable of executing within a given period of time. See also eq. (2), which will be explained in greater detail below. Both processor work and work capacity (variously referred to herein as "processor capacity" for ease of reference) can be computed from data such as—processor utilization, benchmark results, and processor clock-cycle data in one embodiment. Additional processor-work measures can be introduced by combining the above and/or introducing additional elements related to, for example, average number of cycles per instruction, instruction mix, different types of benchmarks, other processor architecture specifics, such as levels of cache sizes, etc. A capacity definition for processors is the maximum processor utilization, 100%, for the full relevant period of time.

For disks (e.g., 120) we formulate multiple notions of disk work. The first measure of disk work is the amount of bytes transferred between the disk and the server. See also eq. (4), which will be explained in greater detail below. This measure is invariant because it does not depend on disk type. An execution of a transaction on the server would require the same byte transfer regardless of what type of disk was connected to the server.

But this definition is insufficient for practical purposes. It refers only to data transfer as seen by the operating system. Transferring, for example, 1 mb/s to a laptop-style disk is not operationally the same as doing that on a server-style disk or a disk array. In addition, modern disks have large memory caches, as do their controllers. Some operating systems report only the data transferred between the system and the disk controller. But some of these transfers are in reality transfers between controller memory cache and operating system cache, which can be significant in modern disks. Thus, the aforementioned definition of work might not always have (usually does not have) a corresponding practical estimate of work capacity—how many bytes could have been transferred if the disk had been fully used. Sometimes, data-transfer rates in reality are much higher than their stated rates. This is often because of robust caching, and illustrates an impracticality in trying to define disk capacity (the maximum work the disk is capable of executing). That capacity will strongly depend on caching behavior (and, possibly, other effects).

In some embodiments, our technology accounts for using disks for different purposes, such as for storing data longer term (where the main usage is that of disk surface) versus storing short-term data, for quick retrieval (like operating-system caches, temporary files, and the like)—where the main usage is the disk channel bandwidth (the I/O).

The first additional measure of disk work (activity) is related to the percent of the time that the disk is busy reading or writing. To compare various disks we multiply that by disk size, and other coefficients in other embodiments. The second measure of disk work (storage) is related to the amount of storage used on the disk.

Both disk-related measures contemplate estimates of work capacity. In the storage context, work capacity (variously referred to as "disk capacity," which is not merely the size of the disk) is total disk storage. In the activity context, disk capacity is the 100% of channel time busy multiplied by the disk size. Additional measures of disk work are also possible, either by combining the above and/or by adding new elements to account for disk controllers, striping, internal organization of disk arrays, etc.

For network components (such as 124) (which we will generally refer to as a "card" or "NIC," though we do not mean to attach a narrow definition to the same because some network interface controllers are integrated and even external to a server), a definition of the network work is the number of bytes transferred by the network card(s). Work capacity is derived from the card's data-transfer rate (such as 1 Gigabit/second) times a given period of time. Additional measures of network work can be included by adding or considering separately other effects related to network-component implementation, its interface to the operating system, protocol, etc.

Similar work and capacity usage metrics can be similarly used for other components (e.g. memory) in connection with our technology.

Capacity Utilization Factor (CUF) Metrics.

We will describe CUF metrics (e.g., PUF 136, DUF 138, NUF 140), which use the elements of computer or component work as described above, and combine them with other elements (e.g., the data in database 174) to derive various measures of an overall utilization of server or group of servers. An overall factor can be used to compare utilization between servers, between groups of servers, between a server and a group of servers, etc. It can also be used to meaningfully aggregate the utilization of groups of servers or individual servers.

Single-Server Utilization

At a high level, our technology contemplates first calculating a utilization of server components (e.g., 118 or more), and from those deriving a utilization factor for a given server, such as SUF 144. For each server component, utilization is defined in one embodiment as the ratio of the work done by the component to its work capacity (or just "capacity") during a given period of time (second, minute, hour, day, etc.)

As mentioned, work (at least as used herein) is an amount of some activity done over some time period. Work is not a measure of activity per second, which would reflect rate.

Processor work is computed as shown in eq. (1) (all equations are included in Table II, above): Processor work=(% Processor utilization/100)*(number of processors) *RPI*time period, where % processor utilization is the average utilization of all processors during a given period of time (which can be provided by monitoring application 130). RPI is a Relative Performance Index, which relates the speed of a given server's processor to processors of other servers. RPI may be simply a clock speed (like 2 GHz) or some benchmark-derived value (like SPEC-INT (see spec.org for the details of this benchmark), MIPS etc). Processor work done over the time period is the number of instructions executed or the number of processor cycles.

For example, consider a 2-processor server running for 3600 seconds with average processor utilization during that time of 20%. Assume that the processors are capable (capacity) of processing 1 gigainstructions per second (relative performance index=1). For such a server processor work=0.2*2*1*3600=1440 [Gigainstructions].

Work capacity is the number of instructions that the processor was capable of executing. Assuming it was working at full capacity throughout the full time: Processor capacity=1.0*2*1*3600=7200 Gigainstructions.

Thus, the processor utilization factor (PUF) 136 would be=1440/7200=0.2.

In general, operating-system instrumentation can provide average processor utilization during a given time, such as '20% during the last hour.' But the system may not be up for the whole period. Consider a 2-processor server that was working for 12 hours with average utilization of 20% but then was taken down for maintenance for 12 hours. Assuming relative performance index of each processor to be 1 (as in the previous example), Processor work=0.2[utilization]*2[processors]*1[rpi]*43200[seconds=12 h]=172800. But the work capacity should be computed against the whole day, not just the uptime: Processor work=1.0[utilization]*2[processors]*1[rpi]*86400[seconds=12 h]=1728000.

Thus, PUF [daily] 136 would be 172800/1728000=0.1.

In one embodiment, it would be incorrect to compute processor work using utilization factor of 0.2 and time factor of the whole day (86400 seconds)—the work was being performed only when the server was up (43200 seconds). The average utilization reported applies only to the time when the server was up, not to the whole day.

For a single server, PUF 136 is generally going to be equal to utilization (when all processors have the same RPI). Differences can exist when multiple servers are considered (described in further detail below).

The Disk Component.

Disk Utilization Factor (DUF) 138 can be computed in several different ways using different definitions of work. One definition of disk work is the number of bytes transferred between the disk 120 and the server memory 128. This measure is invariant; changing the disk for some other disk type would not change the number of bytes transferred. But operationally, computing DUF 138 involves knowing both disk work and disk work capacity (again, or just "disk capacity"). In this case, disk capacity could be defined as the maximum number of bytes that can be transferred between disk 120 and the memory 128. In practice, this metric might be too hard to obtain with sufficient accuracy.

As mentioned, modern disks operate in connection with controllers and have built-in memory caches, sometimes large. When an application has a localized pattern of accesses, a large number of operations are performed as server-memory-to-disk-cache-memory operations, without any physical disk access. Cache operations are significantly faster (maybe 10× times) than physical-disk operations. Thus a disk rated at, say, 80 mb/sec (when performing real disk operation, such as reading a large file) may realize a transfer rate much higher when performing many cached operations. The fraction of cached operations for a given disk/application is unpredictable. Thus, establishing the work capacity in terms of strict bytes transferred is operationally difficult. Computing disk capacity is generally difficult, though it can be done in many specific cases using additional information, such as that of the applicable caching rate.

Another definition of work is the number of disk operations (reads and writes) performed. This is somewhat less invariant than the number of bytes transferred; when the disk is changed, the cluster size (and/or other parameters) may change, resulting in change of the number of disk operations. Similar to the previous case, it is easy to measure the number of transfers (work) but relatively difficult to estimate the maximum number of transfers (disk capacity). Some drivers perform thousands of operations per second even though the nominal number of operations per second was to be about 200-300. Again, computing work capacity (disk capacity) is generally difficult. But again, it can be done in many specific cases using additional information about application behavior and load conditions.

Operationally Practical Computation of Disk Work.

A relatively more suitable measure of disk work is based on the time that the disk was busy handling user's requests. Most operating systems measure percent of the time the disk was busy during some monitored period (e.g., monitored by monitoring application 130). An advantage of this approach is that a natural capacity limit is present. A disk cannot be busy for more than 100% of the given time. To obtain work performed by a disk, we multiply the amount of time that disk was used by the disk size.

For example, for a 100 Gb disk working for one hour with average percent-busy time of 20%, the work done would be 20/100*100 gb/s*3600 s=72000 Gb (consistent with eq. (4). Thus, in one embodiment, we use disk size as a proxy to the volume of data transfer and we use percent-busy as proxy to disk usage.

A note on the dimensions. One approach, described at the beginning of this section starting with 'one definition' was to measure disk work in bytes transferred to and from the disk. The system would provide the number of bytes transferred per second. To obtain work done during some time unit (like an hour) we multiply [average bytes transferred per second] *[number of seconds in the hour] obtaining number of bytes transferred during that hour.

In this approach, we make the disk-transfer rate proportional to disk size. Here, the transfer rate is proportional to 100 Gb/sec. We compute the number of seconds that the disk was used during the hour—20/100*3600=720 seconds; multiplying that time by the transfer-rate factor to obtain 720 seconds*100 gb/sec=72000 Gb. In some embodiments, the work number could include the proportionality factor, but doing so is not necessary. The same standard should be used for all disks (in which case, the proportionality factor is irrelevant).

We are not asserting that the work obtained this way (based on percent busy)—is identical to the work obtained by measuring byte transfers per second (using standard counters for example). It is not. The work we compute here is computed the same way for all disks and allows comparison of disk usage in this dimension. It also allows disk capacity (disk work capacity) to be computed in this dimension, thereby enabling computation of DUF 138.

Work capacity is computed for a given disk during a given timeframe by setting percent busy to 100, thus obtaining: Disk work capacity=100/100*100 gb/s*3600 seconds=360000 Gb (consistent with eq. (5)). Thus the DUF for such a disk would be 72,000 gb/360,000 gb=0.2 (no units, as this is an indicator, or as we also say, factor).

If a server has another disk, with capacity of say 500 Gb, is busy on average 50% of the time during the same hour, the following would be true: disk2 work=0.5*500 gb/s*3600 s=900000 Gb and disk2 capacity=1.0*500 Gb/s*3600 s=1800000 Gb. Thus, the DUF would be 0.5.

Here, server 110 would have two disks with different capacities and usage levels. To compute total DUF 138 for two disks, sum the work done by each disk (total work=72000 Gb+900000 Gb=972000 Gb), sum the capacities of both disks (total capacity=360000 Gb+Gb=2160000 Gb), and divide total work by total work capacity: DUF=972000/2160000=0.45

Total DUF is not an average of multiple disks' DUFs. We sum over works, then we sum over capacities and divide. The total DUF is influenced more by larger disks. If the proportionality factor (between the disk-transfer speed and its size) was included in any of the above calculations it would have cancelled itself out (assuming it was the same for both disks).

In the above considerations (% disk busy) is the percent of time when the disk was busy during a given time period. Percent Disk Busy can be calculated as [100−(PhysicalDisk/% Idle Time)] in one embodiment. This might vary based on operating system, and in some cases the applicable value to be used would be (100%-% idle time).

As mentioned, disks are predominantly used for two purposes: (1) temporary storage of data that cannot be kept in memory (in which an appropriate measure is related to disk activity) or (2) permanent storage of data, like archiving, in which disks may have low activity (% busy or volume of data transfer) but they keep data which cannot be discarded. An example includes storing emails long term. For data-retention disks, a utilization factor (disk-storage-CUF) is provided. It is defined as the ratio of disk space used (expressed in gigabytes) to the total disk capacity, expressed in gigabytes. Thus a 100 Gb disk with 20 Gb space used will have CUF=20/100=0.2. A 500 gb disk with 250 Gb space used will have CUF 250/500=0.5. To compute the CUF for both disks we add the total space used (=20 gb+250 gb) 270 gb and the capacities (=100 gb+500 gb)600 gb. The total CUF is then 270 gb/600 gb=0.45.

Similar considerations can be applied to memory or other components (video cards, etc.), if desired. For example, two Memory Utilization Factors (MUF) could be determined. MUF-sotrage is the ratio of the memory used by all applications running on the server (work) to the total installed memory (capacity). MUF-activity is the ratio of the memory used by all applications running on the server multiplied by processor utilization (work) to total memory (capacity). In contrast to disks, the operating system does not usually measure the % of time that memory was used nor how many bytes were exchanged between memory and devices. Hence we replace a disk's percent-busy time with processor utilization—as processor usage is usually related to memory access. Other proxies may be used on depending on operating systems, instrumentation permitting. The principle is that of (a) realizing that the memory can be reserved but no operations done on it and (b) a measure is used of how much the reserved memory is really used. MUF-activity is used as another measure because some applications (like databases) reserve memory (so OS counters show memory being 'used'), but do not use it much later, because of frequent idling.

The Network Component.

NIC_work=bytes_transferred, consistent with eq. (8). NIC_capacity=maximum number of bytes transferred to the network card(s), eq. (9). NUF 140=NIC_work/NIC_capacity, eq. (10). The computation of NUF for servers with multiple network cards is similar to the computation of NUF for servers with multiple disks.

Computing Overall Server Utilization: SUF1 (Based on Dollar Costs).

In one embodiment, SUF 144 (which can take on multiple forms, such as SUF1 and SUF2) is derived according to our technology based on dollar costs of the relevant server components, as mentioned above. These cost can represent apportionments of overall server costs, actual component costs, estimated component costs, component replacement costs, or a combination of the above.

Each utilization factor (PUF 136, DUF 138, NUF 140) represents the fraction of the resource used in a given time period. Each resource can be different from the others, preventing a mere averaging. For example if server Utilization factors are (0.1, 0.7, 0.1) respectively, there is little information in the overall average of 0.3. So we do not do this. Our technology contemplates considering substantially different components.

To obtain an estimate of the utilization of the total server, we use the dollar cost of various components in one embodiment. Assume the total server price is, say, $10,000. We assign fractions of that amount to various components of the server based on current market pricing or other information in one embodiment. Thus, a server may have processors costing $1,000, disks costing $8,900, and network cards costing $100. We multiply the cost of each element by the element's utilization factor to obtain the usage weighted by cost: CUF-cost=(0.1*1,000$+0.7*8900$+0.1*100$)/(1,000$+8,900$+1,00$)=6340$/10000$=0.634.

In this example, $6,340 worth of components are being used, with the total price of $10,000. Thus, 0.634 is SUF 144 (or SUF1 per eq. (11)).

We can obtain pricing of all server components (including memory, power supply, cabinet), or, as in the above example, only to some. As mentioned, this data can make up component-pricing information 178.

It some situations, the total server price is known, but the price of individual components is not known. In this case estimates can be used. Market prices can be summed and optionally multiplied by a factor so their sum equals the total server price. For example assume one knows that a server price is $10,000; the market value of disks is $5,000, the market value of processors is $2,000; and the market value of memory is $1,000. But one does not have to have precise information on the cost of other elements (like power supply or memory). One can use the information available and compute SUF1 based on known elements of the server. Alternatively one can normalize the prices: total cost of known elements is $8,000, server cost $10,000, so the proportionality factor is $10,000/$8,000=1.25. Then one multiplies the cost of each component by the proportionality factor. So we ascribe to disks the cost of $5,000*1.25=$6,250 and so on. SUF1 is computed based on adjusted prices. In effect, all the missing elements of the server cost are spread over known elements.

When computing SUF1 for server components, one can combine processors and memory and consider them to be one component as far as cost is concerned. The cost of other elements (power supply, enclosure) can be spread across server components.

Elements other than the cost of hardware components may be used in other embodiments; for example, the cost of datacenter floor space, cost of maintenance, etc. These elements may be used separately or in combination, and might also be stored in database 174.

Other benchmarks (besides financial cost of hardware components) may be used to compute other aggregate server metrics. In data centers, power is an important characteristic. Thus, the power usage of each component can be used to compute SUF1 144, or SUF2 (eq. (12)) using a formula similar to eq. (11). This provides a metric estimating how effectively power is being used.

For example, assuming that (processor, disk, network) power usage is respectively (200W,100W,10W) one gets SUF2=(0.1*200W+0.7*100W+10*0.1W)/(200W+100W+10W)=91W/310W=0.29. SUF2 indicates how much of the total power used by the server is really used for processing and how much is wasted.

In practice, each component can use a certain amount of power when fully utilized and less power when utilized at lower capacity. For example processors can use less power when less utilized, and disk drives can be turned off after some period of inactivity. That can be included into the computation of SUF2.

The power used by the component can be estimated from a manufacturer's description or measured.

Computing server-group utilization (SGUF 186, see SGUF1 and SGUF2, equations (11) and (12) respectively in Table II).

The previous sections described computation of utilization factors for each component of a single server. They also described computation of a single SUF for the total server, that SUF being SUF1 (finance based) and SUF2 (power based).

We now describe computation of a utilization factor for a group of servers (SGUF 186). We provide for the following example a group that includes two servers (110 and 112), working for 3600 seconds.

Say server 110 has two processors 122 with relative performance index 1 (each) and utilization 20%, one disk 120 that is 500 Gb with busy time 5%, and one network card 124 of one-gigabit type with utilization of 10%.

Say server 112 has 16 processors 152 with relative performance index 2 (each) and utilization of 80%, five disks 150 that are 500 Gb with average busy time of 20%, and two network cards 154 of one-gigabit type with average utilization of both 10%.

The approach here is similar to the one previously described to compute a total DUF for two disks. Generally, we compute the sum of work done on all elements, the sum of work capacities of all elements, and divide.

Generally, the approach is to compute, separately for each server and server component, work and work capacity; then add work done by like-components on all servers (disks to disks, processors to processors, . . . ), to obtain total work done on the like components on all servers; that is, total work done by processors 122 and 152, total work done by disks 120 & 150, and total work done by network cards 124 and 154. Work capacity is computed for all like components and summed across all servers, obtaining total work capacity for processors, total work capacity for disks, and total work capacity for network cards.

The computation of work and work capacity for each individual server and server component are as described in the previous section 'Computing single-server utilization.'

For components of server 110: Processor work=0.2*2*1*3600=1440; work capacity=1.0*2*1*3600=7200; Disk work (activity) =0.5*500*3600=90000; work capacity=1.0*500*3600=1800000; and Network work=0.1*1.0*3600=360; work capacity=1.0*1.0*3600=3600.

For components of server 112: Processor work=0.8*16*2*3600=92160; work capacity=1.0*16*2*3600=115200; Disk work(activity) =0.2*5*500*3600=1800000; work capacity=9000000; and Network work=0.1*2*3600=720; work capacity=1.0*2*3600=7200.

PUF for the server group is then the sum of work done divided by the sum of capacities: PUF=(1440+92160)/(7200+115200)=0.765, which can be completed by processing server 116 by way of data 146A and 184A.

Total DUF=(90000+1800000)/(1800000+9000000)
=0.175 [(work 120+work 150)/(capacity 120+ capacity 150].

NUF=(360+720)/(3600+7200)=0.1.

Note that in some prior-art techniques, the (CPU) utilization of server 110 would be 0.2 (20%) and server 112 was 0.8 (80%), and averaging utilizations between servers would result in 'average utilization' of 0.5. But according to our technology, the PUF of 0.765 is significantly different, reflecting the incorporation of differences in number of processors, clock speeds etc.

Utilization Factors Based on Power and on Finance for a Server Group.

Using the same data as in the previous example, we will provide an example of computing server-group-utilization factors based on power (SGUF2) and financial costs (SGUF1). We combine the utilization factors of each hardware component with that component's price. A difference in the group scenario is that we are using the groups' utilization factor instead of a single server's utilization factor, and we are using the sum component prices over all servers in that group.

Again, say server 110 has two processors 122 with relative performance index 1 (each) and utilization 20%, one disk 120 that is 500 Gb with busy time 5%, and one network card 124 of one-gigabit type with utilization of 10%.

Again, say server 112 has 16 processors 152 with relative performance index 2 (each) and utilization of 80%, five disks 150 that are 500 Gb with average busy time of 20%, and two network cards 154 of one-gigabit type with average utilization of both 10%. The table below summarizes the CUF and price for the components of each server.

For server group, the factor values for each component are computed as in the previous section 'computing server-group utilization.' The price for each component is the sum of prices of the components for each individual server. Table 3 is provided below for convenience.

TABLE 3

Server-Group Example Figures

|   | Server 110 | Server 112 | Server Group | $ Used |
|---|---|---|---|---|
| PUF | 0.2 | 0.8 | 0.765 | |
| Processor Price | $1,000 | $10,000 | $11,000 | $8,415 [=11000 * 0.765] |
| DUF | 0.05 | 0.2 | 0.175 | |
| Disk Price | $ 250 | $ 1,250 | $ 1,500 | $ 256.5 [=1500 * 0.175] |
| NUF | 0.1 | 0.1 | 0.1 | |
| Network Price | $ 50 | $ 100 | $ 150 | $15 [=150 * 0.1] |

The column "$ Used" in Table 3 contains the 'used' values for the hardware components of the server group. They are obtained by multiplying the component price by the component utilization factor, in the same way as when computing finance values for individual servers—described earlier.

The total value of all components for the server group is $12,650[=11,000+1,500+150]. The used value is $8,692.5 [=8415+256.5+15]. SGUF1 for server group is computed by dividing the used value by the total value, giving 0.687 (=8692.5/12650), consistent with eq. (13).

Here, SGUF1 is high despite server 110 being underutilized. This is because server 110 is much cheaper than server 112, which is well utilized. The SGUF1 of a server group reflects a price-weighted combination of a utilization factor of individual servers in one embodiment.

Other elements besides the cost of hardware components may be used, for example, the cost of data center floor space or the cost of maintenance as mentioned. These elements may be used separately or in combination. Similar computations apply when computing SGUF2 (group utilization based on power usage).

Figure 2:
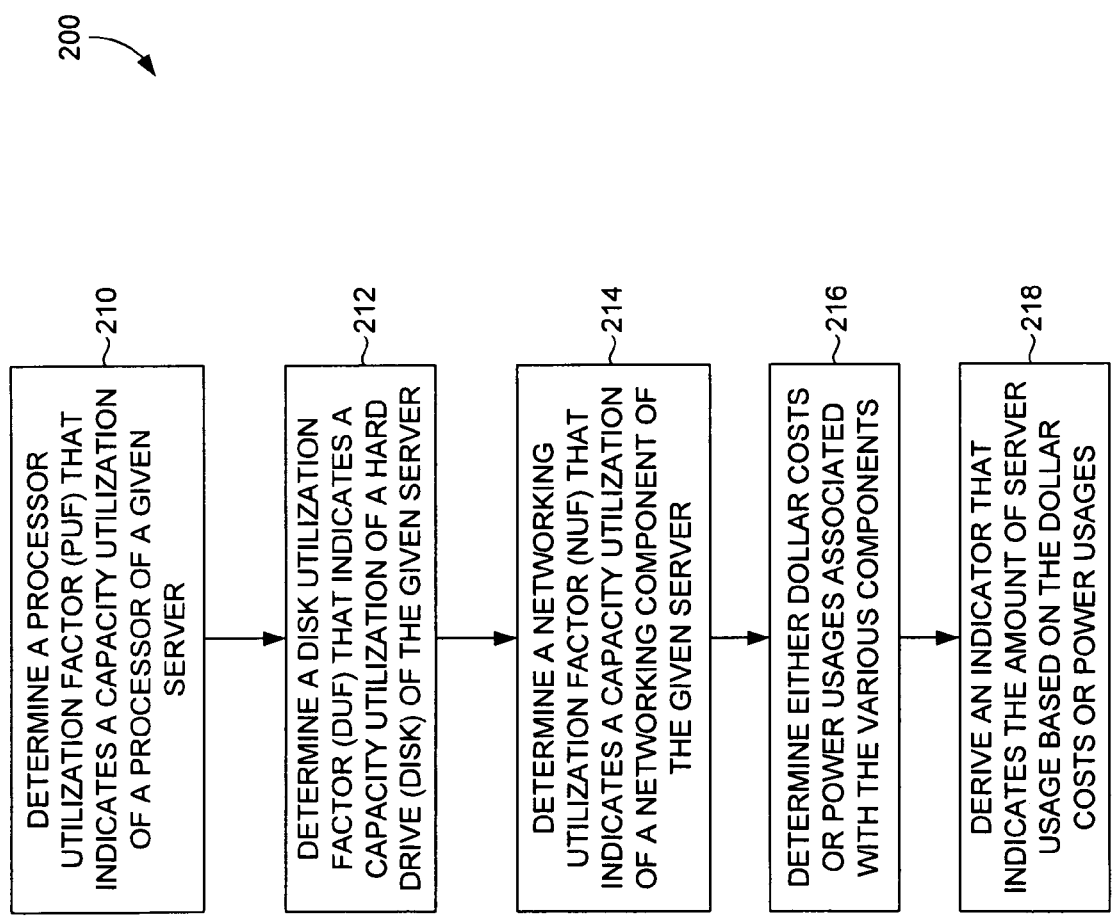
FIGS. 2 and 3 depict illustrative ways of determining a server's utilization according to embodiments of the present invention.

Turning now to FIG. 2, an illustrative method of measuring an amount of server utilization of a given server is provided and referenced generally by the numeral 200. At a step 210, a processor utilization factor (PUF) that indicates a capacity utilization of a processor of a given server is determined. With exemplar reference to FIG. 1, this would include determining PUF 136 associated with processor 122. We have previously described methods for calculating PUF 136; thus, we will not reiterate those lower level details here. But see eq. (3) and the previous discussion for a description of how to calculate PUF 136.

At a step 212, a disk utilization factor (DUF) that indicates a capacity utilization of a hard drive of the given server is determined. As with determining the PUF, determining DUF 138 was also previously described in detail. We direct the readers attention to our earlier discussion as well as eq. (6). Similarly, a networking utilization factor (NUF) that indicates a capacity utilization of a networking component of the given server is determined at a step 214. With reference to FIG. 1, this would include determining NUF 140 based on network cards 124.

At a step 216, either dollar cost or power usages associated with the various components are determined. As previously described, dollar costs associated with the components of interest (such as processors 122, network cards 124, and disk 120) are used in one embodiment to help ultimately derive an indicator that indicates the amount of server usage of the given server (step 218) and as previously described, the dollar costs could be actual dollars spent, cost estimates, or replacement costs of the actual components. In still other embodiments, when only the server cost is known, the cost of the various components can be a p-portioned and then used as weights in connection with the PUF, DUF, and NUF to ultimately derive the aforementioned indicator, which can take the form of SUF 144.

And in another embodiment, power usages of the various components are used to weight the utilization factors of the components that make up a given server to ultimately determine SUF 144.

We have previously described how determining the various utilization factors includes determining an amount of work of each of the components and comparing the actual amount of work to a corresponding maximum work capacity of each of the components to derive the respected utilization factors (e.g., PUF 136, DUF 138, NUF 140). In Table 2, equations 3, 6, and 10 illustrate this concept. By way of example, determining processor work includes considering an average percent utilization that the processor of interest was being utilized during some time period. In another embodiment, determining processor work further includes considering a relative performance index that is based on a speed of a given processor. A relative performance index can also be based on an architecture or generally an overall performance of a given processor. Determining processor work also includes measuring—considering a measure of the first time period. For example, if an hour is the time window of interests, and seconds is the unit measure, then a measure of the first time period would be 3,600 seconds.

Similarly, determining disk work includes considering an average percent-busy time that the disk was busy during some time period. This time period might be the same as the previous time period that we just mentioned in connection with determining processor work, but it may also be another time period. Determining disk work also includes considering a data-transfer rate measured as a capacity of the disk. We previously mentioned how our technology contemplates using disk size as a proxy for data-transfer rate. Determining the disk work also includes considering a measure of the time period of interest, which is akin to considering the measure of the time period in connection with determining processor work.

We have also described how that the maximum work capacity of a processor is equal to the number of instructions that it could have processed if it was maximally utilized during some time period in one embodiment of our invention. In some embodiments, the number of instructions are scaled by a relative performance index. Sometimes, the relative performance index is simply one. As also mentioned the maximum work capacity of a given disk is equal to the data-transfer rate multiplied by the measure of the relevant time period in one embodiment. The maximum work capacity of the networking component is equal to a maximum amount of data that it was capable of communicating during the time period of interest.

These steps can be repeated for a second server, and then a server-group utilization factor (such as SGUF1EE6) can be derived, which indicates a collective utilization of both servers. Of course, this could be repeated for many hundreds or thousands of servers to determine an overall utilization factor. In the server-group scenario, an amount of work in work capacity of each component (e.g., processors, disks, etc.) are considered and waited by either financial cost or power usage to determine the ultimate SGUF.

Figure 3:
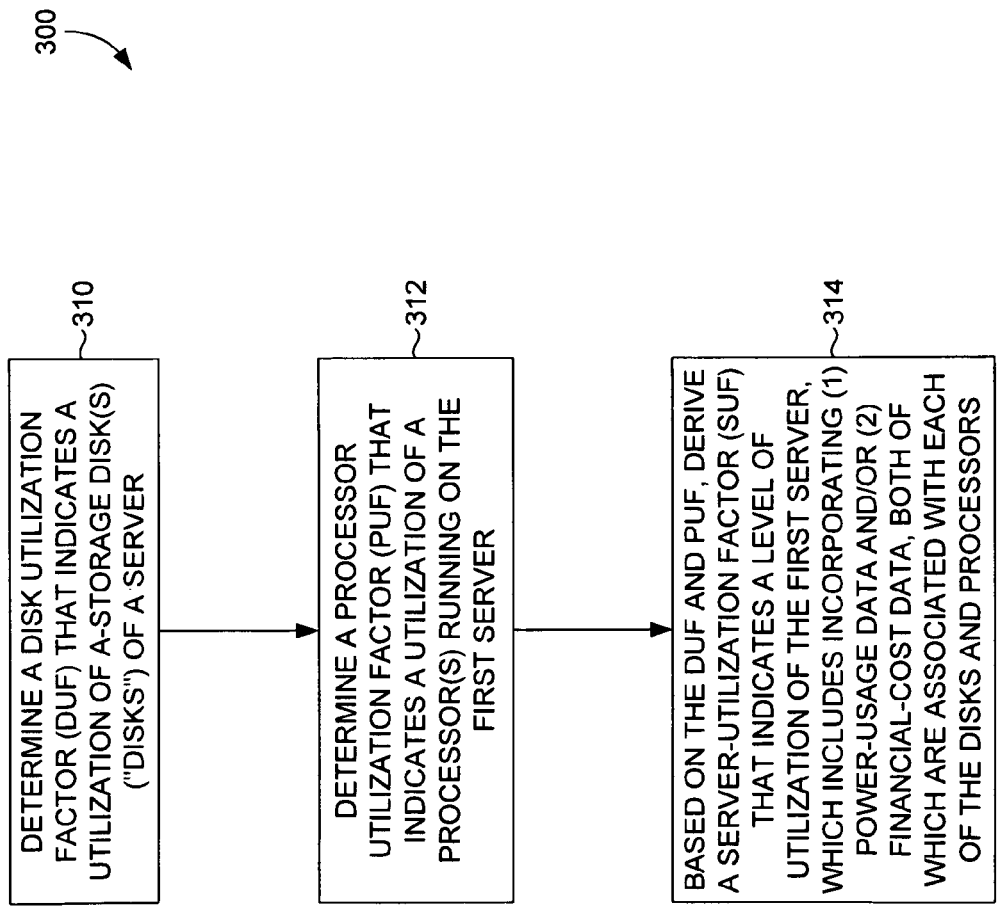

Turning now to FIG. 3, an illustrative method for causing a computing device to determine a utilization benchmark for a given server is provided and referenced generally by the numeral 300. A computing device that might perform the method of FIG. 3 includes first server 110 or processing server 116. That is, the same server whose usage characteristics are gathered could determine its own utilization or, in other embodiments, those data metrics 146 could be communicated to another server such as processing server 116, which could receive the data 146(*a*) and derive PUF 136, DUF 138, and/or NUF 140. If processing server 116 is employed, various utilization factors can be kept separate by way of including server identifier 142/170. At a step 310, a DUF is determined, and then a PUF is determined at a step 312 (not that the order matters). Based on the DUF and PUF obtained, a server-utilization factor is derived at a step 314 indicating a level of utilization of the server of interest. Deriving the SUF includes incorporating power-usage data 180 and/or financial-cost data 178. The financial-cost data 178 includes data related to each component of interest. Similarly, power-usage information 180 also includes information related to each component of interest. This process could be supplemented by determining a network-utilization factor if this is desired.

Figure 4:
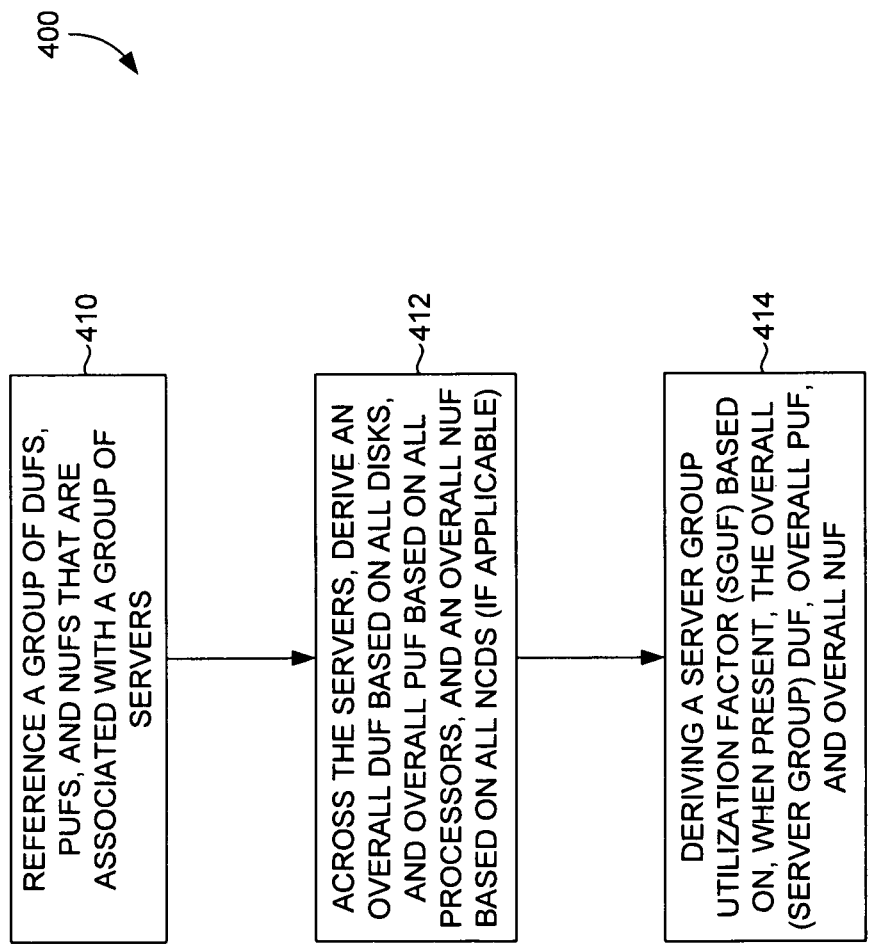
FIG. 4 depicts an illustrative method of determining a server-group's utilization according to an embodiment of the present invention.

Turning now to FIG. 4, a method is provided for determine a utilization bench mark that indicates a utilization of a set of servers according to an embodiment of the present invention and referenced generally by the numeral 400. At a step 410, a group of DUFs, PUFs, and NUFs are referenced that are associated with a corresponding group of servers. With reference to FIG. 1, this would include considering by way of data 146(*a*) and 184(*a*) the various utilization factors (136, 138, 140, 164, 166, and 168) that were sent from first server 110 and second server 112.

At a step 412, an overall DUF, PUF, and NUF is derived across all servers. In connection with the description of the previous Table 3, we provide an example of determining a PUF for server group, a DUF for server group, and a NUF for server group. For example, Table 3 indicates that a PUF for a given server group was 0.765, which was derived by considering the collective work of each processor as well as the work capacity of each processor. Similar algorithms were applied to derive the server group DUF (0.175) and server group NUF (0.1). Thus, as to each disk, its capacity was included; as to each processor, a relative performance index was considered, and as to each network communication device, a maximum through put capacity is considered.

At a step 414, a server-group utilization factor is derived based on the overall (or server-group) DUF, PUF, and NUF (when applicable if present). Again, we provided an example of deriving the overall server-group utilization factor in connection with the description of Table 3. The server-group utilization factor can be derived based on financial costs of the various components of the various servers or on power-usage characteristics of the same components.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more hardware memory devices having computer-executable instructions embodied thereon that, when executed, perform a method of measuring an amount of server utilization of a given server, the method comprising:

determining a processor utilization factor (PUF) that indicates a capacity utilization of a first processor of the given server;

determining a disk utilization factor (DUF) that indicates a capacity utilization of a first hard drive (disk) of the given server based on an amount of time the disk is busy during a monitored period of time;

determining a networking utilization factor (NUF) that indicates a capacity utilization of a first networking component of the given server, the networking component facilitating communication of data between the given server and an external network-communications device;

determining a power-benchmark set that includes a processor-power benchmark associated with the first processor indicating a rated power or an estimated power consumed by the first processor, a disk-power benchmark for the first disk indicating a rated power or an estimated power consumed by the first disk, and a networking-power benchmark associated with the networking component indicating a rated power or an estimated power consumed by the networking component;

deriving an indicator that indicates the amount of server usage based on the PUF and processor-power benchmark, the DUF & disk-power benchmark, and the NUF and networking-power benchmark, wherein deriving the indicator includes performing the mathematical operation:

$$((PUF)\cdot(\text{processor-power benchmark})+(DUF)\cdot(\text{disk-power benchmark})+(NUF)\cdot(\text{networking-power benchmark}))/((\text{processor-power benchmark})+(\text{disk-power benchmark})+(\text{networking-power benchmark})).$$

2. The one or more hardware memory devices of claim 1, wherein determining the PUF, DUF, and NUF includes one or more of the following:

determining an amount of work of the first processor (processor work), and comparing the processor work with a maximum work capacity of the first processor;

determining an amount of work of the first disk (disk work), and comparing the disk work with a maximum work capacity of the first disk;

determining an amount of work of the first networking component (networking work), and comparing the networking work with a maximum work capacity of the networking component.

3. The one or more hardware memory devices of claim 2, wherein each of the comparing steps includes dividing the respective amounts of work by their corresponding maximum work capacities.

4. The one or more hardware memory devices of claim 2, wherein:

determining the processor work includes considering one or more of,

A) an average percent utilization that the first processor was being utilized during a first time period, B) a relative performance index that is based on a speed of the first processor, and C) a measure of the first time period; and determining the networking work includes considering an amount of data transferred by the first networking component during a second period of time.

5. The one or more hardware memory devices of claim 4, wherein said first time period and said second time period are both the same.

6. The one or more hardware memory devices of claim 4, wherein the maximum work capacity of the first processor is equal to a number of instructions that the first processor could have processed if it were maximally utilized during the first time period, scaled by the relative performance index; and the maximum work capacity of the networking component is equal to a maximum amount of data that the first networking component was capable of communicating during the second period of time.

7. The one or more hardware memory devices of claim 1, further comprising repeating the steps of claim 1 for a second server.

8. The one or more hardware memory devices of claim 7, further comprising determining a server-group utilization factor that indicates a collective utilization of both the given server and the second server.

9. The one or more hardware memory devices of claim 8, wherein determining the server-group utilization factor includes considering an amount of work and an amount of work capacity of each processor, disk, and networking component in both the given server and the second server weighted by corresponding financial costs of each component.

10. The one or more hardware memory devices of claim 8, wherein determining the server-group utilization factor includes considering an amount of work and an amount of work capacity of each processor, disk, and networking component in both the given server and the second server weighted by corresponding power usages of each component.

11. One or more hardware memory devices having computer-executable instructions embodied thereon that, when executed, cause a computing device to perform a method of determining a utilization benchmark of a first server, the method comprising:

at the computing device, determining a disk utilization factor (DUF) that indicates a utilization of one or more mass-storage disks ("disks") of the first server based on an amount of time the disks are busy during a monitored period of time;

determining a processor utilization factor (PUF) that indicates a utilization of the one or more processors ("processors") running on the first server;

determining a power-benchmark set that includes a processor-power benchmark associated with the first processor indicating a rated power or an estimated power consumed by the first processor and a disk-power benchmark for the first disk indicating a rated power or an estimated power consumed by the first disk; and deriving an indicator that indicates the amount of server usage based on the PUF and processor-power benchmark and the DUF and disk-power benchmark, wherein deriving the indicator includes performing the mathematical operation:

$$((PUF)\cdot(\text{processor-power benchmark})+(DUF)\cdot(\text{disk-power benchmark}))/((\text{processor-power benchmark})+(\text{disk-power benchmark})).$$

12. The one or more hardware memory devices of claim 11, wherein deriving the indicator that indicates the amount of server usage includes referencing a log file generated by a data agent that receives usage characteristics of the disks and the processors, wherein the log file includes the DUF and the PUF.

13. The one or more hardware memory devices of claim 12, wherein deriving the indicator that indicates the amount of server usage further comprises weighting the DUF and the PUF based on dollar costs respectively associated with the disks and the processors.

14. The one or more hardware memory devices of claim 12, wherein deriving the SUF further comprises weighting the DUF and the PUF based on power usages respectively associated with the disks and the processors.

15. The one or more hardware memory devices of claim 11, further comprising
determining a networking utilization factor (NUF) that indicates a utilization of one or more network-communications devices ("NCDs") in the first server; and
wherein deriving the indicator that indicates the amount of server usage further includes considering the NUF and one or more of A) a power benchmark or B) a cost benchmark associated with the NCDs.

16. One or more hardware memory devices having computer-executable instructions embodied thereon that, when executed, causes a processing server to perform a method of determining a utilization benchmark that indicates a utilization of a plurality of servers, the method comprising:
at the processing server, receiving from each of the plurality of servers
A) a disk utilization factor (DUF) that indicates a utilization of one or more mass-storage disks ("disks") of that server;
B) a processor utilization factor (PUF) that indicates a utilization of the one or more processors ("processors") running on that server; and
C) a networking utilization factor (NUF) that indicates a utilization of one or more mass-storage network-communications devices ("NCDs") in that server;
deriving
A) an overall DUF for the plurality of servers based on a combination of all disks in the plurality of servers,
B) an overall PUF for the plurality of servers based on a combination of all processors in the plurality of servers, and
C) an overall NUF for the plurality of servers based on a combination of all NCDs in the plurality of servers,
wherein the deriving includes considering at least one attribute (listed below) of each disk, processor, and NCD among the disks, processors, and NCDs,
A) wherein, as to each disk, a disk attribute considered includes a capacity of the disk,
B) wherein, as to each processor, a processor attribute considered is a relative performance index that indicates a performance capability relative to other processors, and
C) wherein, as to each NCD, a maximum throughput capacity is considered;
determining a power-benchmark set that includes a processor-power benchmark associated with the one or more processors indicating a rated power or an estimated power consumed by the one or more processors, a disk-power benchmark for the one or more disks indicating a rated power or an estimated power consumed by the one or more disks, and a networking-power benchmark associated with the one or more NCDs indicating a rated power or an estimated power consumed by the one or more NCDs; and
deriving an indicator that indicates an overall utilization of the plurality of servers based on the overall PUF and processor-power benchmark, the overall DUF & disk-power benchmark, and the overall NUF and networking-power benchmark, wherein deriving the indicator includes performing the mathematical operation:

((overall PUF)·(processor-power benchmark)+(overall DUF)·(disk-power benchmark)+(overall NUF)·(networking-power benchmark))/((processor-power benchmark)+(disk-power benchmark)+(networking-power benchmark)).

17. The one or more hardware memory devices of claim 16, wherein deriving the indicator that indicates an overall utilization of the plurality of servers includes considering a work and work capacity associated with each of the disks, processors, and networking components.

18. The one or more hardware memory devices of claim 17, wherein deriving the indicator that indicates an overall utilization of the plurality of servers further includes weighting the overall PUF, the overall NUF, and the overall DUF by a dollar cost respectively associated with the processors, networking components, and disks.

19. The one or more hardware memory devices of claim 17, wherein deriving the indicator that indicates an overall utilization of the plurality of servers further includes weighting the overall PUF, the overall NUF, and the overall DUF by a power usage respectively associated with the processors, networking components, and disks.

* * * * *